(12) United States Patent
Li

(10) Patent No.: US 11,418,036 B2
(45) Date of Patent: Aug. 16, 2022

(54) POWER SYSTEM

(71) Applicant: TOSHIBA MITSUBISHI-ELECTRIC INDUSTRIAL SYSTEMS CORPORATION, Chuo-ku (JP)

(72) Inventor: Haiqing Li, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 0 days.

(21) Appl. No.: 17/284,515

(22) PCT Filed: Jul. 3, 2019

(86) PCT No.: PCT/JP2019/026512
§ 371 (c)(1),
(2) Date: Apr. 12, 2021

(87) PCT Pub. No.: WO2021/001965
PCT Pub. Date: Jan. 7, 2021

(65) Prior Publication Data
US 2021/0344201 A1    Nov. 4, 2021

(51) Int. Cl.
H02J 3/32      (2006.01)
H02J 7/00      (2006.01)
H02J 7/35      (2006.01)

(52) U.S. Cl.
CPC ............. *H02J 3/32* (2013.01); *H02J 7/0031* (2013.01); *H02J 7/35* (2013.01)

(58) Field of Classification Search
CPC .... H02J 3/37; H02J 7/0031; H02J 7/35; H02J 7/00
See application file for complete search history.

(56) References Cited

FOREIGN PATENT DOCUMENTS

JP    2015-109796 A    6/2015

OTHER PUBLICATIONS

International Search Report dated Sep. 24, 2019 in PCT/JP2019/026512 filed Jul. 3, 2019.

*Primary Examiner* — Robert L Deberadinis
(74) *Attorney, Agent, or Firm* — Oblon, McClelland, Maier & Neustadt, L.L.P.

(57) ABSTRACT

A power system includes a photovoltaic cell panel, a first power conversion device converting the DC power from the photovoltaic cell panel into AC power, and outputting the AC power to an electric power grid, a DC-side switch device provided between the photovoltaic cell panel and the first power conversion device and opening upon a trouble, a storage battery, and a second power conversion device connected to a connection point between the photovoltaic cell panel and the DC-side switch device and controlling charging and discharging of the storage battery. The second power conversion device includes a normal charging control mode for charging the storage battery based on a command signal from the system host monitor. Disconnection charging control mode may be executed when the DC voltage of the connection point exceeds a predetermined threshold value even if the command signal does not instructs the normal charging control mode.

6 Claims, 3 Drawing Sheets

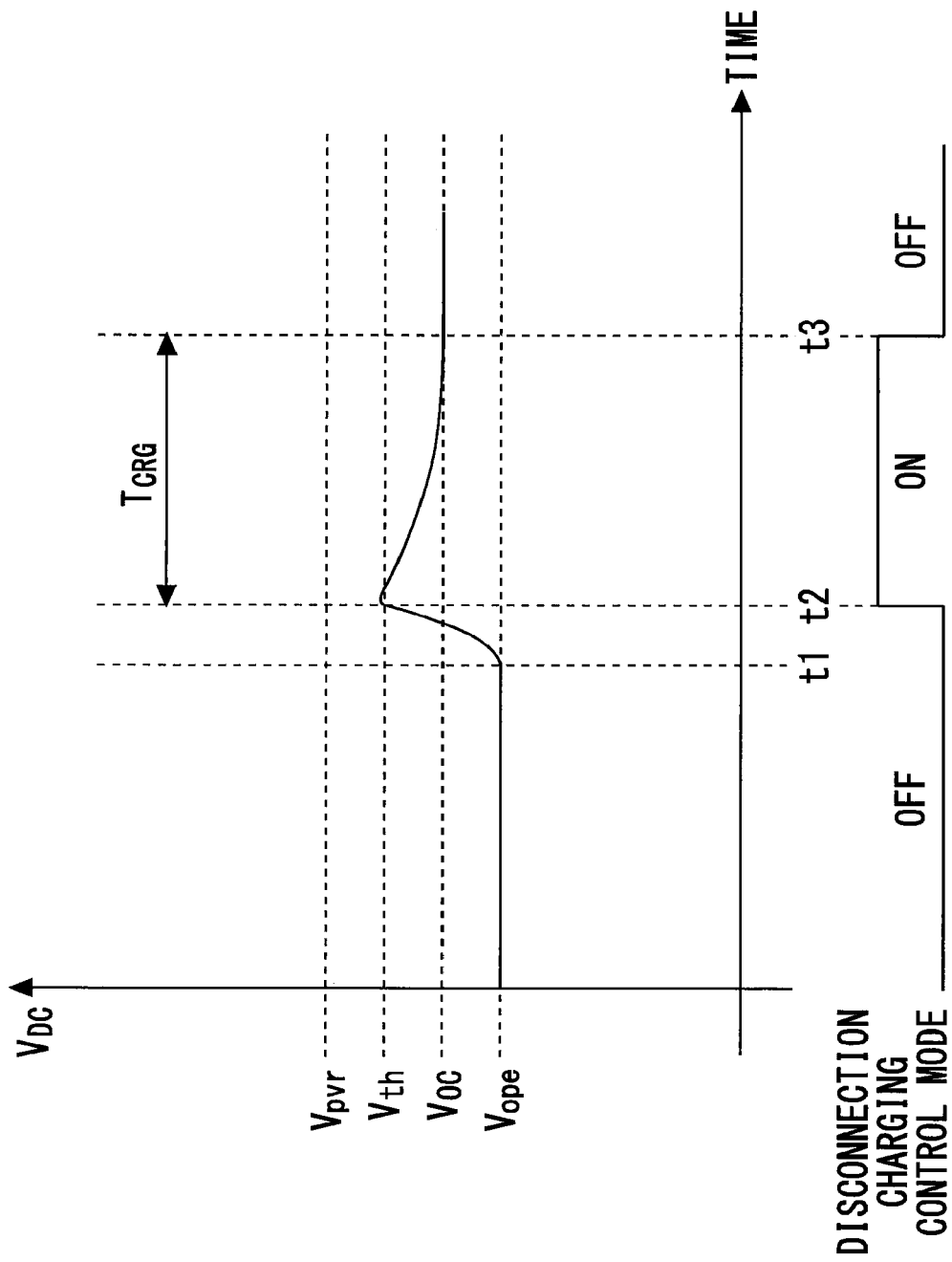

POWER SYSTEM

TECHNICAL FIELD

The present applications relates to a power system.

BACKGROUND

Conventionally, for example, as described in JP 2015-109796, a DC link type photovoltaic power generation system is known. The DC link system is a system in which a battery system is connected to a direct current (DC) path provided between a photovoltaic cell panel and a power conversion device.

CITATION LIST

Patent Literature

[PTL 1] JP 2015-109796 A

SUMMARY

Technical Problem

When trouble occurs in a grid interconnection system, the power conversion device on the photovoltaic cell panel side may be disconnected from an electric power grid. If a DC-side switch device between the photovoltaic cell panel and the power conversion device is opened while the photovoltaic cell panel is generating electric power, the generated power by the photovoltaic cell panel loses its flow path. This may cause an overvoltage and a large burden on the photovoltaic cell panel.

The present application has been made to solve the above problems, and an object thereof is to provide a power system capable of suppressing an overvoltage of the photovoltaic cell panel.

Solution to Problem

A power system according to the present application includes:
a photovoltaic cell panel;
a first power conversion device configured to convert DC power from the photovoltaic cell panel into AC power, the first power conversion device configured to output the AC power to an electric power grid;
a DC-side switch device provided between the photovoltaic cell panel and the first power conversion device, the DC-side switch device configured to open when trouble occurs;
a storage battery; and
a second power conversion device connected to a connection point between the photovoltaic cell panel and the DC-side switch device, controlling charging/discharging of the storage battery,
wherein, the power system is configured to execute a disconnection charging control mode for charging the storage battery by converting the DC power from the photovoltaic cell panel if a DC voltage at the connection point exceeds a predetermined threshold value upon opening of the DC-side switch device.

Advantageous Effects of Invention

According to the above described power system, when magnitude of the DC voltage at the connection point exceeds the predetermined threshold value in accordance with the disconnection of the power system from the electric power grid, the power system executes the disconnection charging control mode in which the second power conversion device charges the storage battery. This makes it possible to absorb the generated power of the photovoltaic cell panel into the storage battery. As a result, it is possible to suppress the overvoltage of the photovoltaic cell panel when trouble occurs.

BRIEF DESCRIPTION OF DRAWINGS

FIG. 3 is a time chart illustrating the operation of the power system according to the embodiment.

DESCRIPTION OF EMBODIMENTS

Figure 1:
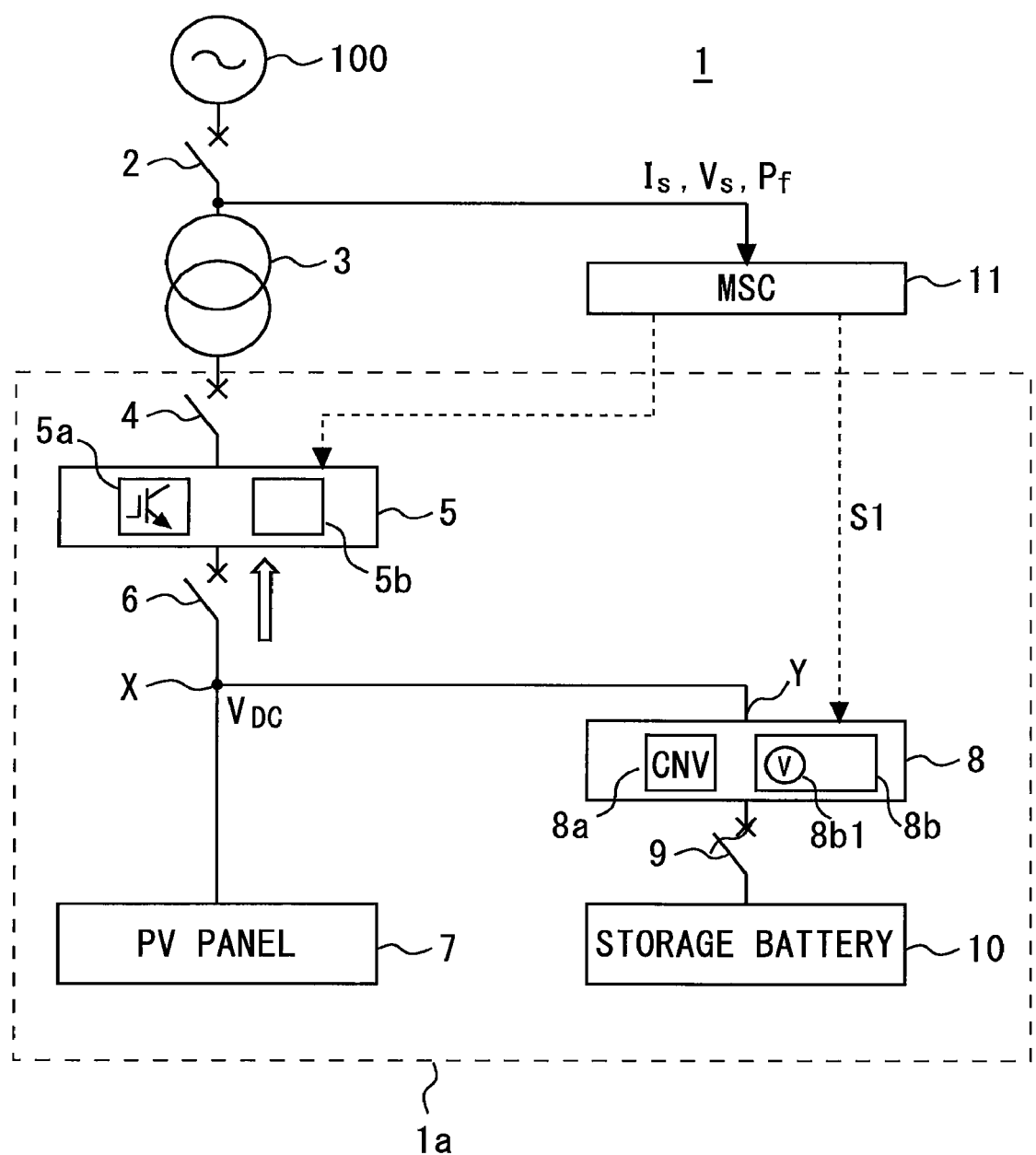
FIG. 1 is a diagram showing a configuration of a power system according to an embodiment.
Figure 2:
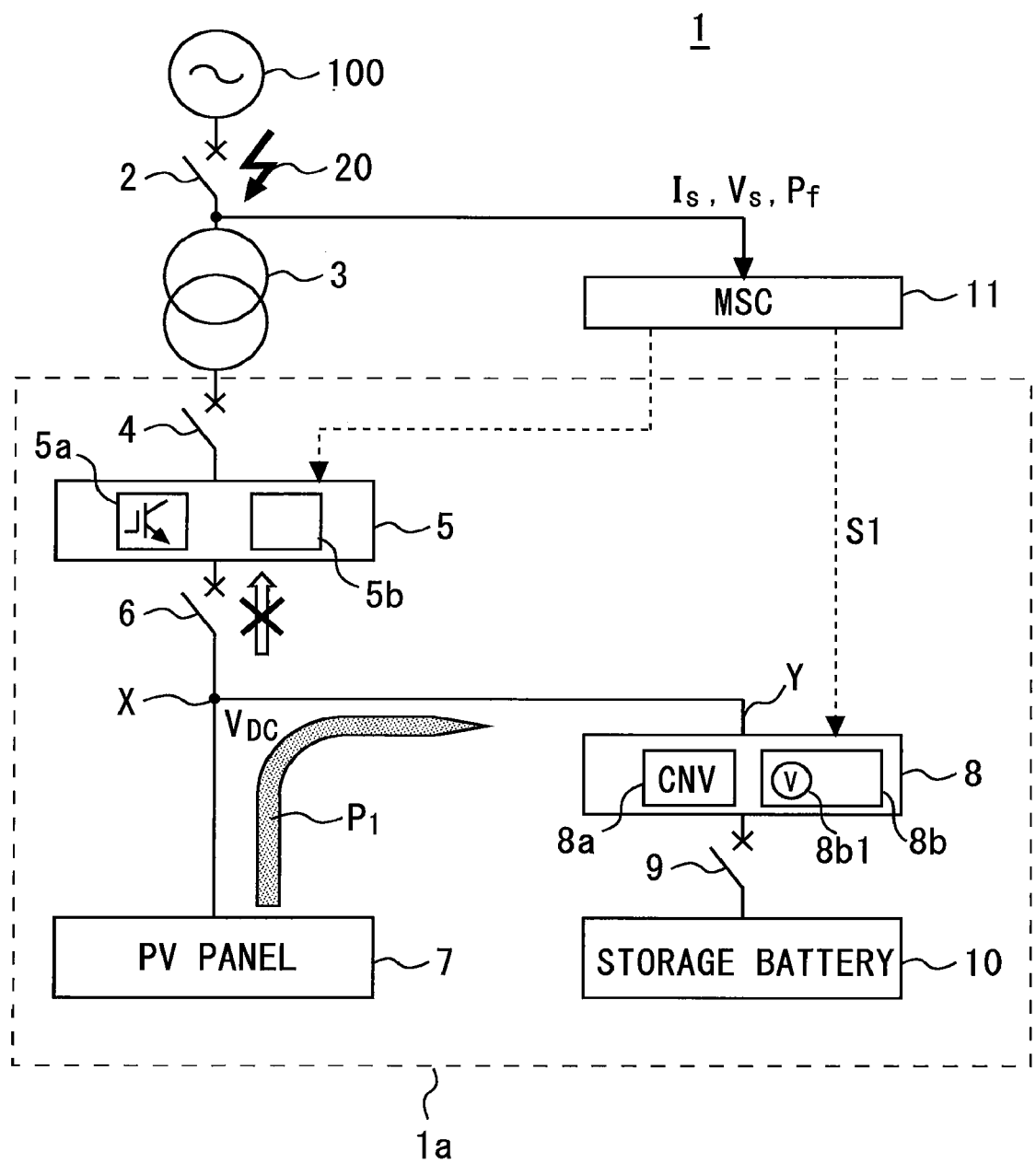
FIG. 2 is a diagram explaining operation of the power system according to the embodiment.

FIGS. 1 and 2 are diagrams illustrating a configuration of a power system 1 according to an embodiment. FIG. 1 is a schematic representation during normal operation. FIG. 2 shows a schematic representation of system disconnection operation when a grid trouble 20 occurs.

The power system 1 includes a DC link power generation system 1a, a grid-side switch device 2, an interconnection transformer 3, and a main site controller (MSC) 11 which is a system host monitoring device. One end of the grid-side switch device 2 is connected to the electric power grid 100, and another end of the grid-side switch device 2 is connected to one end of the interconnection transformer 3. Another end of the interconnecting transformer 3 is connected to one end of an AC-side switch device 4. It should be noted that one of various devices such as switches and circuit breakers can be used for a component described as a "switch device" in the embodiment.

The DC-link power generation system 1a includes the AC-side switch device 4, a first power conversion device 5, a DC-side switch device 6, a photovoltaic cell panel 7, a second power conversion device 8, a storage battery switch device 9, and a storage battery 10. The first power conversion device 5 and the second power conversion device 8 are also referred to as a Power Conditioner System (PCS).

Another end of the AC-side switch device 4 is connected to an AC output terminal of the first power conversion device 5. A DC input terminal of the first power conversion device 5 is connected to one end of the DC-side switch device 6.

Another end of the DC-side switch device 6 is connected to the photovoltaic cell panel 7 via a connection point X. The connection point X is also connected to a first input/output terminal of the second power conversion device 8. A second input/output terminal of the second power conversion device 8 is connected to the storage battery 10 via the storage battery switch device 9.

In the embodiment, although only one DC link power generation system 1a is shown in FIG. 1 for simplicity, the power system 1 may be constructed such that a plurality of the DC link power generation systems 1a are connected to the interconnection transformer 3. The photovoltaic cell panel 7 may be provided as a photovoltaic cell array in which a plurality of photovoltaic cell modules are connected in series and in parallel.

The MSC 11 receives a grid current Is, a grid voltage Vs, and a power factor Pf via, for example, a power measurement meter (not shown). The MSC 11 transmits an active power upper limiter $P^*_1$ to the first power conversion device 5 in the DC-link power generation system 1a based on the above various parameters such as the grid current Is. It should be noted that, in general, only a generation upper limiter value is transmitted to a power conversion device (PV-PCS) for photovoltaic power generation, and an actual generation amount is adjusted according to MPPT control of the PV-PCS.

The first power conversion device 5 is configured to convert DC power from the photovoltaic cell panel 7 into AC power, and to output the AC power to the electric power grid 100. The first power conversion device 5 includes a first power conversion circuit 5a and a first power conversion control circuit 5b.

The first power conversion circuit 5a is, for example, a voltage-type three-phase AC inverter circuit configured by semiconductor-switching elements such as IGBTs. The first power conversion control circuit 5b turns on and off the semiconductor switching elements in the first power conversion circuit 5a by generating a PWM control signal as a gate pulse, by means of the MPPT control function, in accordance with the active power upper limiter $P^*_1$ transmitted from the MSC 11 as an upper limit.

The DC-side switch device 6 is provided between the photovoltaic cell panel 7 and the first power conversion device 5. During normal operation of the power system 1, the grid-side switch device 2, the AC-side switch device 4, and the DC-side switch device 6 are turned on. It should be noted that the DC-side switch device 6 and the grid-side switch device 2 may be provided as a part of the first power conversion device 5, or may be installed independently as a separate component from the first power conversion device 5.

During abnormalities such as an occurrence of the grid trouble 2, the semiconductor switching element of the first power conversion device 5 is controlled to be gate-blocked, the AC-side switch device 4 and the DC-side switch device 6 are opened, and operation of the first power conversion device 5 is stopped. By opening the AC-side switch device 4, it is possible to disconnect the DC-link power generation system 1a from the electric power grid 100.

The storage battery 10 may be selected from various power storage devices for ESS (Energy Storage System). The storage battery 10 may be selected from a group consisting of an electric double layer capacitor (EDLC), a lithium ion capacitor (LIC), a lithium ion secondary battery (LIB), a nickel-metal hydride battery, a SciB (registered trademark) using lithium titanate, a lead storage battery, a sodium-sulfur battery, and a fuel cell (FC).

The storage battery 10 and the second power conversion device 8 are connected via the storage battery switch device 9. In the embodiment, it is assumed that the storage battery switch device 9 is kept turned on even during normal operation of the power system 1, and even during the occurrence of the grid trouble 20.

The second power conversion device 8 is connected to the connection point X between the photovoltaic cell panel 7 and the DC-side switch device 6. The second power conversion device 8 includes a second power conversion circuit 8a and a second power conversion control circuit 8b.

The second power conversion circuit 8a may be selected from various known DC-DC converter circuits. The second power conversion circuit 8a may be, for example, a PWM switching converter, or may be a buck-boost converter including a chopper circuit. The second power conversion control circuit 8b controls on/off of a semiconductor switching element such as IGBT or MOSFET in the second power conversion circuit 8a based on a command signal S1 from the MSC 11. The command signal S1 may include an active power command $P^*_2$, or may include a current command value or a voltage command value. The second power conversion device 8 may operate so as to perform input/output of active power to the connection point X based on the active power command $P^*_2$, or may operate so as to perform charge/discharge current control or voltage control based on the current command value or the voltage command value on the storage battery or the connection point X. Depending on the type of the storage battery 10 and the contents of the control system, details of a command value in the command signal S1 may be determined.

The second power conversion control circuit 8b includes a voltage detection circuit 8b1. The voltage detection circuit 8b1 detects a DC voltage $V_{DC}$ inputted to the second power conversion device 8. The voltage detection circuit 8b1 includes a DC voltage sensor. In the embodiment, the DC voltage $V_{DC}$ is detected by the voltage detection circuit 8b1. Further, a predetermined threshold value $V_{th}$ is set in advance in the control circuit 8b.

The second power conversion control circuit 8b executes control modes which include a discharge control mode and two charge control modes. The two charge control modes include a normal charging control mode and a disconnection charging control mode.

The discharge control mode is a mode for operating the second power conversion device 8 so as to output the power stored in the storage battery 10 to the connection point X based on the command signal S1 from the MSC 11. The normal charging control mode is a mode for operating the second power conversion device 8 so as to store surplus generated power at the connection point X into the storage battery 10, during a system normal operation in which the DC-side switch device 6 is turned on, based on the command signal S1 from the MSC 11. In some cases, due to agreements with electric power companies, a site composite output upper limit value may be defined about magnitude of a site composite output power which is outputted to the electric power grid 100. In this case, by executing the normal charging control mode, the surplus generated power exceeding the site composite output upper limit can be charged into the storage battery 10.

The disconnection charging control mode is a mode for operating the second power conversion device 8 so as to charge the storage battery 10 by converting the generated power from the photovoltaic cell panel 7 when the DC voltage $V_{DC}$ at the connection point X exceeds the predetermined threshold value $V_{th}$ in response to the disconnection of the first power conversion device 5. In the embodiment, even if the normal charging control mode is not instructed in the command signal S1, the disconnection charging control mode is executed when the DC voltage $V_{DC}$ at the connection point X exceeds the predetermined threshold value $V_{th}$.

In the discharge control mode and the two charging control modes, contents of the command signal S1 include charging/discharging instructions and charging/discharging amounts. For example, a command value such as the active power command $P^*_2$ included in the command signal S1 may be adjusted to any positive value or any negative value from the viewpoint of instructing input or output of the active power at a self-output point Y.

According to the embodiment, the following effects are obtained. At the time of occurrence of the grid trouble 20 shown in FIG. 2, the DC-side switch device 6 is opened to disconnect the first power conversion device 5 on the photovoltaic cell panel 7 side from the electric power grid 100. Since generated power P1 from the photovoltaic cell panel 7 shown in FIG. 2 loses its flow path when the DC-side switch device 6 is opened, the output voltage of the photovoltaic cell panel 7 may become excessive unless any countermeasures are taken.

In this regard, the power system 1 according to the embodiment executes the disconnection charging control mode if the magnitude of the DC voltage $V_{DC}$ at the connection point X exceeds the predetermined threshold value $V_{th}$. The disconnection charging control mode causes the second power conversion device 8 to switch its operation mode so as to charge the storage battery 10. At this time the connection point X and the second power conversion device 8 are kept connected, and this results in that current can flow toward the storage battery 10 since a disconnected current path of the first power conversion device 5 side can be replaced with another path to the storage battery 10 side. Such a current path replacement can cause the storage battery 10 to absorb the power generated by the photovoltaic cell panel 7. As a result, it is possible to suppress the overvoltage of the photovoltaic cell panel 7 when the grid trouble 20 occurs.

According to the embodiment, even if the normal charging control mode is not instructed in the command signal S1, the second power conversion device 8 is configured so that the disconnection charging control mode is executed when the DC voltage $V_{DC}$ at the connection point X exceeds the predetermined threshold value $V_{th}$. Since the occurrence of the grid trouble 20 is also detected in the MSC 11 based on a change in the grid voltage Vs, it may be considered to switch the command signal S1 into charge control when the MSC 11 detects the grid trouble 20. However, in this case, a certain delay occurs by passing through the MSC 11. In this regard, according to the embodiment, since control is completed inside the second power conversion device 8 without passing through the MSC 11, it is advantageous to operate the disconnection charging control mode so that the second power conversion device 8 directly detects a voltage rise at the connection point X and responds quickly to the voltage rise.

It should be noted that, according to the embodiment, the voltage detection circuit 8b1 in the second power conversion control circuit 8b detects that the DC voltage $V_{DC}$ exceeds the predetermined threshold value $V_{th}$. The built-in voltage detection circuit 8b1 can perform a quick voltage detection such as microseconds order. Therefore, it is possible to quickly detect the rise of the DC voltage $V_{DC}$ at the time of the grid trouble 20.

It may be assumed that the first power conversion device 5 and the second power conversion device 8 are connected by a communication line, and a stop of the first power conversion device 5 may be noticed to the second power conversion device 8 via the communication line. However, in the technique of using such a communication line, it may take several tens of milliseconds or several seconds of time when communication speed is slow. If communication time of about a few seconds is taken, there occur a problem that control response is too slow as compared with a rising speed of the DC voltage $V_{DC}$ at the time of the occurrence of the grid trouble 20. In this regard, by using the voltage detection circuit 8b1 provided in the second power conversion device 8, it is possible to quickly detect the rise of the DC voltage $V_{DC}$. It should be noted that, when a communication line is installed between the first power conversion device 5 and the second power conversion device 8, there occur disadvantages that installation work may take time, cost may raise, or reliability deterioration such as disconnection of the communication line may occur.

It should be noted that a converter device used as the second power conversion device 8 is generally provided with the voltage detection circuit 8b1 for detecting an input voltage. In this regard, according to embodiments, use of the built-in voltage detection circuit 8b1 also has an advantage of being easy to build in terms of hardware and software since no new additional components are required.

FIG. 3 is a time chart illustrating the operation of the power system 1 according to the embodiment. When the grid trouble 20 occurs at time t1 in the time chart of FIG. 3, the DC voltage $V_{DC}$ at the connection point X steeply increases from the normal operation voltage $V_{opc}$.

The DC-voltage $V_{DC}$ eventually reaches the predetermined threshold $V_{th}$ at time t2. At time t2 when it is determined that the $V_{DC}>V_{th}$, in response to this voltage determination, the second power conversion control circuit 8b turns on the disconnection charging control mode. In response thereto, the second power conversion circuit 8a performs power conversion so as to charge the storage battery 10.

Thereafter, at time t3 when the time $T_{CRG}$ has elapsed, the DC voltage $V_{DC}$ at the connection point X converges to an open circuit voltage $V_{OC}$ of the photovoltaic cell panel 7. The disconnection charging control mode is turned off at time t3 when the voltage convergence is confirmed. It should be noted that a determination condition of the voltage convergence for turning off the disconnection charging control mode may be $V_{DC} \leq V_{OC}$, and a modification thereof may be $V_{DC} \leq V_{th\_OC}$. $V_{th\_OC}$ is a voltage convergence threshold value which is defined to be a slightly higher voltage than the $V_{OC}$.

As shown in FIG. 3, the predetermined threshold value $V_{th}$ is preferably defined to be higher than the open circuit voltage $V_{OC}$ of the photovoltaic cell panel 7 and lower than a withstand voltage $V_{pvr}$ of the photovoltaic cell panel 7. Thus it is possible to set the predetermined threshold value $V_{th}$ for starting the disconnection charging control mode to an appropriate value.

In the embodiment, the predetermined threshold value $V_{th}$ is set higher than the open circuit voltage $V_{OC}$ of the photovoltaic cell panel 7. The second power conversion device 8 may be configured, after the disconnection charging control mode is started, to stop the disconnection charging control mode when the DC voltage $V_{DC}$ is lowered to the open circuit voltage $V_{OC}$.

The storage battery 10 includes a charge upper limit voltage $V_{limit}$. The second power conversion device 8 may include an overcharge control mode for continuing the disconnection charging control mode even if a voltage of the storage battery 10 reaches the charge upper limit voltage $V_{limit}$ at a start of the disconnection charging control mode or after the start thereof.

Generally, the charge upper limit voltage $V_{limit}$ corresponding to SOC upper limit of the storage battery 10 is determined sufficiently lower than a physical upper limit voltage at which the storage battery 10 will be irreversibly destroyed. Further, from the viewpoint of the overvoltage countermeasure of the photovoltaic cell panel 7 at the time of occurrence of the grid trouble 20, it is sufficient to execute a short time charging operation to the extent for absorbing the overvoltage. Therefore, in the overcharge control mode, even if the SOC of the storage battery 10 is 100%, by temporarily performing emergency power absorption of the storage battery 10, it is possible to prioritize the protection of the photovoltaic cell panel 7 at the time of occurrence of the grid trouble 20.

It should be noted that, when operating the overcharge control mode, a normal protective function of a protective circuit in the storage battery 10 is preferably provided with a time margin of several seconds to several tens of seconds. This is because that the normal protective function is generally configured so as to stop charging operation immediately when the storage battery 10 reaches the charge upper limit voltage $V_{limit}$.

REFERENCE SIGNS LIST

1 Power system
1*a* DC-link power generation system
2 Grid-side switch device
3 Interconnection transformer
4 AC-side switch device
5 First power conversion device
5*a* First power conversion circuit
5*b* First power conversion control circuit
6 DC-side switch device
7 Photovoltaic cell panel
8 Second power conversion device
8*a* Second power conversion circuit
8*b* Second power conversion control circuit
8*b*1 Voltage detection circuit
9 Storage battery switch device
10 Storage battery
20 Grid trouble
S1 Command signal
$V_{DC}$ DC voltage
$V_{limit}$ Charge upper limit voltage
$V_{OC}$ Open-circuit voltage
$V_S$ Grid voltage
$V_{th}$ Predetermined threshold value
X Connection point

The invention claimed is:

1. A power system comprising:
   a photovoltaic cell panel;
   a first power conversion device configured to convert DC power from the photovoltaic cell panel into AC power, the first power conversion device configured to output the AC power to an electric power grid;
   a DC-side switch device provided between the photovoltaic cell panel and the first power conversion device, the DC-side switch device configured to open upon occurrence of a trouble in the electric power grid;
   a storage battery; and
   a second power conversion device connected to a connection point between the photovoltaic cell panel and the DC-side switch device, the second power conversion device configured to control charging and discharging of the storage battery,
   wherein, the power system is configured to execute a disconnection charging control mode for charging the storage battery by converting the DC power from the photovoltaic cell panel if a DC voltage at the connection point exceeds a predetermined threshold value upon opening of the DC-side switch device.

2. The power system according to claim 1,
   wherein the second power conversion device includes a normal charging control mode for charging the storage battery based on a command signal from a system host monitoring device, and
   wherein the disconnection charging control mode is executed when the DC voltage at the connection point exceeds the predetermined threshold value even if the command signal does not instruct the normal charging control mode.

3. The power system according to claim 1,
   wherein the second power conversion device includes a voltage detection circuit to detect an inputted DC voltage, and the second power conversion device detects that the DC voltage detected by the voltage detection circuit exceeds the predetermined threshold value.

4. The power system according to claim 1,
   wherein the predetermined threshold value is determined to be higher than an open circuit voltage of the photovoltaic cell panel and to be lower than a withstand voltage of the photovoltaic cell panel.

5. The power system according to claim 1,
   wherein the predetermined threshold value is set higher than an open circuit voltage of the photovoltaic cell panel, and
   wherein the second power conversion device is configured, after the disconnection charging control mode is started, to stop the disconnection charging control mode when the DC voltage is detected to be converged to the open circuit voltage.

6. The power system according to claim 1,
   wherein the storage battery includes a charge upper limit voltage, and
   wherein the second power conversion device includes an overcharge control mode to continue the disconnection charging control mode even if a voltage of the storage battery reaches the charge upper limit voltage at a start of the disconnection charging control mode or after the start.

* * * * *